March 16, 1965 W. A. CURBY 3,174,125
MECHANICAL PRESSURE SENSOR
Filed June 5, 1961 3 Sheets-Sheet 1
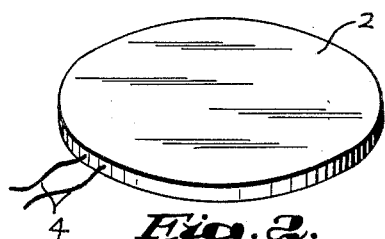
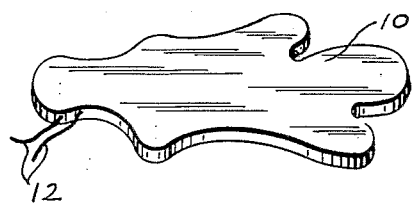
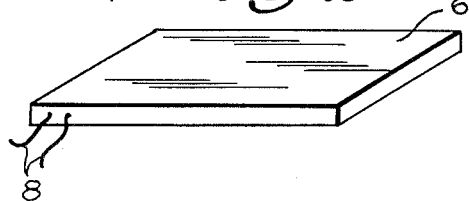
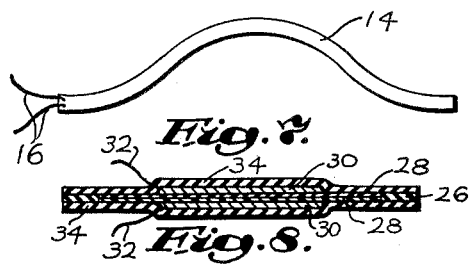
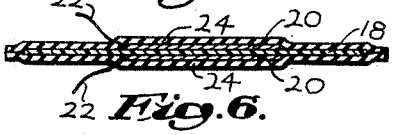
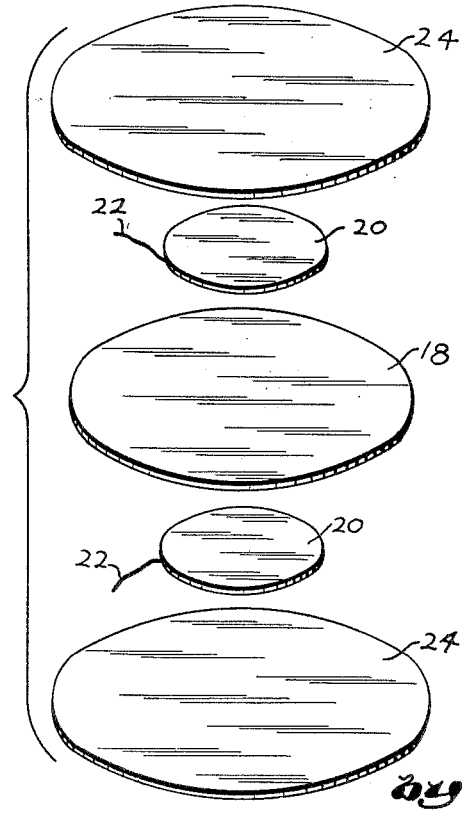
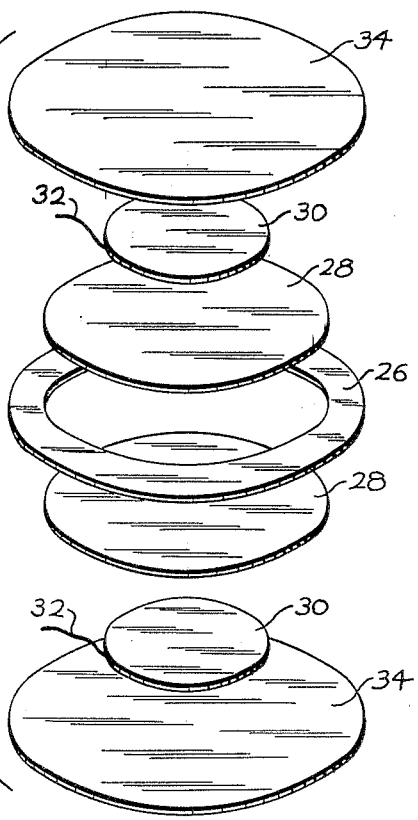
Inventor:
William A. Curby,
by Arnold C. Rood Attorney March 16, 1965　　　W. A. CURBY　　　3,174,125
MECHANICAL PRESSURE SENSOR
Filed June 5, 1961　　　　　　　　　　3 Sheets-Sheet 2
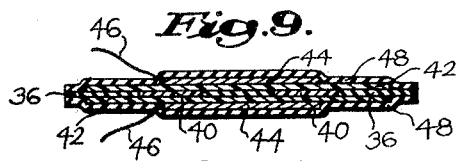
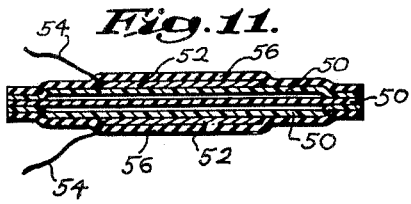
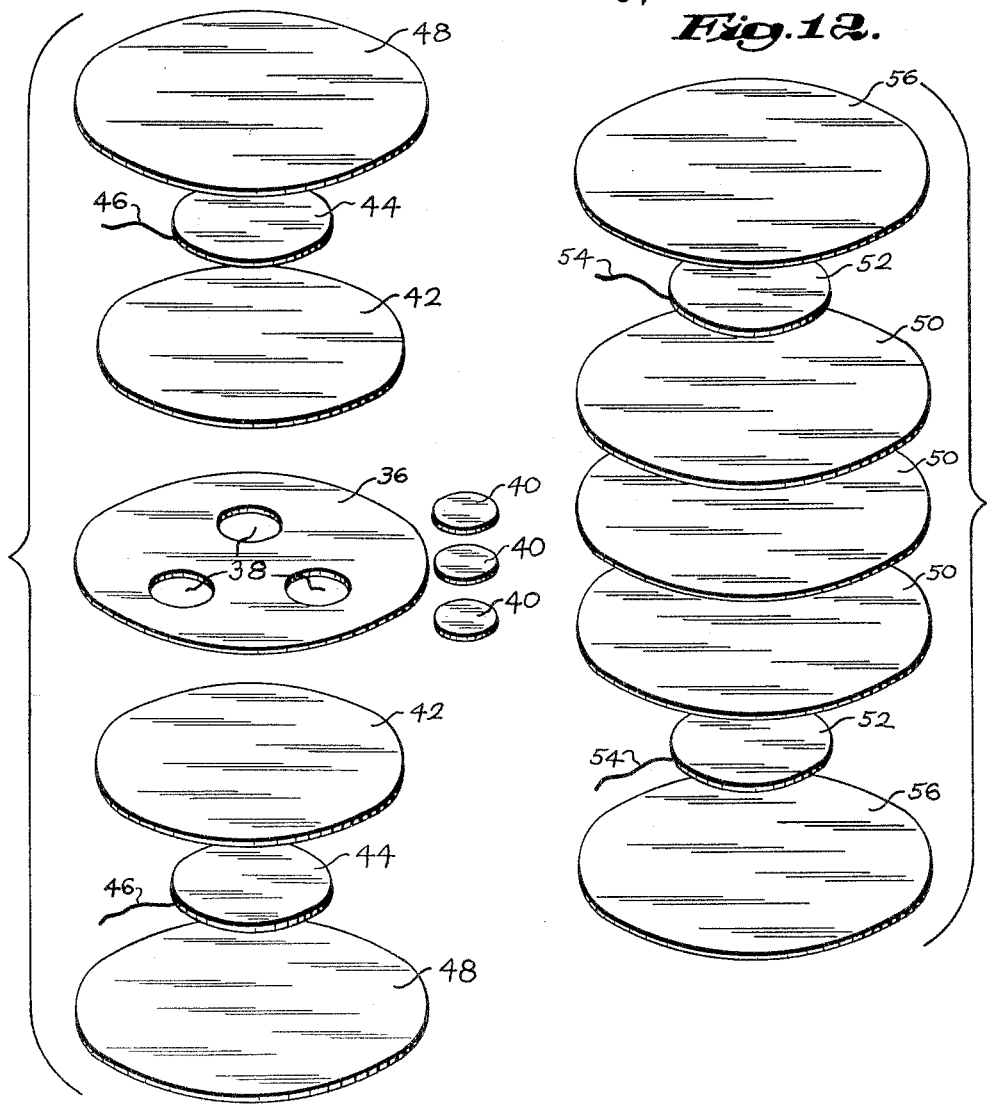
Inventor:
William A. Curby,
by Arnold C. Rood
Attorney March 16, 1965        W. A. CURBY        3,174,125
MECHANICAL PRESSURE SENSOR
Filed June 5, 1961        3 Sheets-Sheet 3
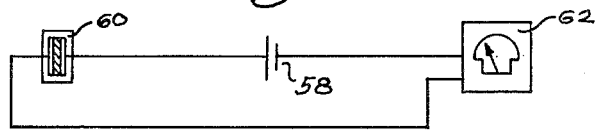
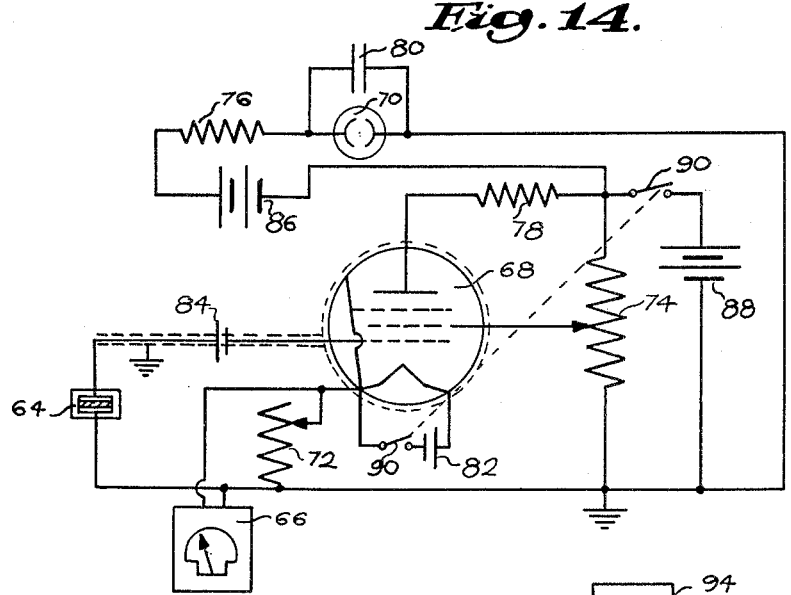
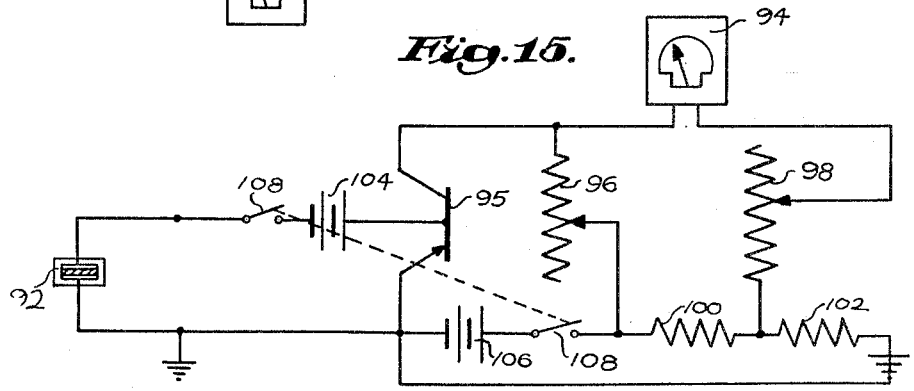
Inventor:
William A. Curby,
by Arnold C. Rood
Attorney

United States Patent Office 3,174,125
Patented Mar. 16, 1965

3,174,125
MECHANICAL PRESSURE SENSOR
William A. Curby, 1663 Commonwealth Ave. W.,
Newton, Mass.
Filed June 5, 1961, Ser. No. 116,915
8 Claims. (Cl. 338—47)

This application is a continuation-in-part of my co-pending application Serial No. 808,468, filed April 23, 1959 now abandoned.

This invention relates to transducers, and more particularly to means for translating mechanical pressure into electrical terms.

In accordance with the present invention, it has been discovered that certain materials, comprising a vapor permeable polymeric base containing a vaporizable, ionizable compound, have semi-conductive electrical properties and, when maintained in a closed atmosphere of predetermined character between electrodes, exhibit electrical resistance which varies accurately and consistently in accordance with mechanical pressure exerted thereon. Such semi-conductors exhibit electrical resistance in the general neighborhood of from .001 to 200 megohms and preferably 1 to 200 megohms, or to express the electrical characteristics in terms of conductance, they exhibit a conductance in the vicinity of $$\frac{1}{0.001} \text{ to } \frac{1}{200}$$

megmhos and preferably $$1 \text{ to } \frac{1}{200}$$

megmhos.

Accordingly, if a body of such semi-conductive material is placed between electrodes in a closed atmosphere and electricity is passed through said semi-conductive material between said electrodes, mechanical pressure applied to the body can be quickly and accurately determined in terms of electrical characteristics. Thus, for example, if direct current electricity at constant voltage is passed through the body of semi-conductive material between said electrodes, the electrical resistance of said body varies inversely with the applied mechanical pressure. In accordance with Ohm's law, with constant voltage, the direct current electricity passing through said semi-conductive material varies inversely with the resistance of the semi-conductive material exhibited during the application of mechanical pressure, and directly in proportion to the applied mechanical pressure. This direct current electricity in ordinarily measured in terms of fractions of a milliampere. Thus, by measuring the current through the body with such constant voltage, the applied pressure can be measured. It will be understood that, alternatively, electricity of constant amperage might be passed through the semi-conductor body in which case the voltage would change proportionately with applied mechanical pressure, and said changes in voltage might be measured to thereby measure the applied pressure.

Pressure sensing units according to this invention may be employed to measure mechanical pressure of from less than an ounce per unit area to pressures of the magnitude of tons per unit area. Furthermore, the transducer units may vary in area from those sufficiently small to fit into a dental cavity, to those of unlimited maximum area.

Preferably, the vapor permeable polymeric base permeated with the ionizable compound and constituting the body of semi-conductive material and the electrodes are flexible so that the transducer units are flexible in character so as to accommodate themselves to nonplanar or mobile surfaces relative to which mechanical pressure is to be measured. Such transducers are characterized by their general flexibility without exhibiting noticeable resistivity change while yet varying measurably in electric resistance when subjected to varying mechanical pressures in directions normal to the electrode surfaces.

In view of the small voltages and extremely small amperages ordinarily employed in operating the transducer system of this invention, extremely thin electrodes such as of gold, silver, platinum, nickel, Phosphor bronze or aluminum may be employed, with negligible heating effect resulting from the passage of electricity. As aforesaid, this makes possible flexibility of the transducer unit, economy of construction, and the production of thin units capable of being employed in small spaces. The materials of which the electrodes are composed are such that they will not affect the immediate environment and surface characteristics will not be affected by the environment within the encapsulating unit.

In order to provide mechanical protection to the transducer unit, to electrically insulate it and to preclude the access of moisture to the interior of the unit, the transducer unit is ordinarily constructed in cassette form with the covering being of some material, preferably elastic, such as rubber, or a resin, in which the semi-conductor body and electrode assembly are encapsulated to thereby seal such assembly from the outside environment and electrically insulate it. The semi-conductor body containing the ionizable compound and with associated electrodes is encapsulated to prevent changes of condition of the semi-conductor body and electrodes and thus to render constant the response of the unit to changes in temperature. It is necessary to provide a hermetic seal because the resistance of the semi-conductor body varies inversely with the amount of ionizable compound contained thereby. Consequently, this amount must be kept constant to achieve predictable results.

The encapsulating material is one which will completely seal off the atmosphere outside of the unit, which will seal the interior of the unit electrically, and which will maintain the integrity of the predetermined atmosphere and environment within the unit. Epoxy resins have been found highly suitable for use as the encapsulating or casing material and a specific example of a commercial product for this purpose is marketed under the commercial name of "Scotchcast No. 5." Other materials may be employed for encapsulating purposes, for example vapor proof resins such as vinyl resins. Silicone grease also exhibits possibilities for this purpose. The encapsulated transducer may be encased in an outer casing. The nature of the outer casing material of course affects the range of mechanical pressures to be measured, a stout metallic outer covering over the encapsulated unit making possible the measurement of mechanical pressures in a higher range than when a soft rubber outer covering is employed.

As aforesaid, the semi-conductor body comprises a vapor permeable base of a polymer containing an ionizable, vaporizable compound.

The polymer base is preferably in the form of a single sheet of material or a plurality of sheets of laminated construction.

The composition of the vapor permeable polymer base may vary, but I have found regenerated cellulose such as cellophane and unsized rayon fabric to exhibit superior properties for this purpose. Other illustrative vapor permeable base materials which may be employed in connection with this invention are other celluloses including the lower alkyl celluloses, such as ethyl cellulose and methyl cellulose, and vapor permeable vinyl resins having repeating side chain radicals of the group consisting of hydroxyl and halogen radicals, such as polyvinyl chloride.

In general, cellulosic materials are preferred. Also, as aforesaid, it is preferred that the material be flexible.

It is noted that all these polymeric base materials comprise long chain polmers having a plurality of repeating hydroxyl or halogen, particularly chloro, side chains or radicals bonded to the polymer skeleton.

A non-particulate base material is preferred in order to obtain more stable response characteristics. However, as aforesaid, laminar material is satisfactory.

The vaporizable, ionizable compound is associated with the vapor permeable polymeric base preferably by absorption or adsorption of the compound in the form of a vapor by the base prior to encapsulation and before or after the association of electrodes therewith. Thus, the base is permeated with the vapor. With a cellophane body, for example, the cellophane is preferably first desiccated. Subsequently, the cellophane is caused to carry or contain the ionizable, vaporiazable compound. Preferably the ionizable compound is added to the base by exposing the desiccated base to an atmosphere of the compound in vapor form until equilibrium is established. It is not certain whether the compound is adsorbed or absorbed but in any event, the base takes on the compound. Good results have been achieved with cellophane by merely exposing it to normal room conditions, i.e. relative humidity between about 40 and 80 at room temperature.

The vaporizable, ionizable compound may vary but it has been found that water, hydrogen chloride, ammonium hydroxide and ammoniacal water are highly satisfactory, water being preferred. It is noted that these compounds are ionizable into hydrogen or ammonium cations.

The compound to be used for any particular situation will vary depending on the temperature conditions under which the pressure is to be measured, different compounds providing higher sensitivity over a different temperature range. Thus, for example, subjecting the desiccated cellophane to water vapor will provide high sensitivity within the range of about minus 5 to about plus 110° C. Good sensitivity within this same temperature range may be achieved by subjecting the desiccated cellophane to hydrogen chloride (HCl) vapor, but the change in resistance with variation in pressure will be of a different magnitude. High sensitivity within the range of about minus 50 to 0° C. is afforded by subjecting the desiccated cellophane to ammoniacal water ($NH_3+H_2O$) or ammonium hydroxide ($NH_4OH$) vapor.

The functioning of the above vapors suggests their ionization to impart to the semi-conductor body electrical conductivity. It is believed that the normally non-conductive polymeric base when permeated with the ionizable compound, which may be called an activator, is rendered semi-conductive by migration of ions, hydrogen ions in the case of moisture, through the semi-conductor body. To explain more fully with reference to cellophane, cellophane is made up of a plurality of polymeric chains having a plurality of repeating hydroxyl side chain radicals weakly bonded to the polymer skeletons and some of which are closely adjacent to each other. Because of this weak bond, these hydroxyl radicals form a weak chemical bond with the hydrogen ions of the water to cause ionization of the water. Probably adjacent hydroxyl radicals share a hydrogen ion so it is probably bonded to adjacent hydroxyl ions. Upon coupling a source of electrical current to the semi-conductor body, the charge of electrons built up on the positive electrode surface of the body causes the weak hydroxyl-hydrogen ion bonds to be broken. The released hydrogen ions are attracted to other adjacent hydroxyl radicals with which they become weakly bonded. This bond is again broken and the hydrogen ions migrate to other adjacent hydroxyl radicals on the same polymer skeleton and adjacent skeletons and in this way hydrogen ions finally migrate to the negative electrode to cause conductance through the semi-conductor body.

It is believed that resistivity decreases as the pressure increases because the higher the pressure the closer the polymer skeletons are forced together, thus bringing into closer proximity the weakly bonded radicals to thereby increase the rate of migration of the hydrogen ions. It is believed that one of the reasons why better results are achieved with non-particulate base materails is that with particulate base materials the non-uniform interfacial areas which affect migration of the hydrogen ions contribute to non-uniform response.

In view of the above theoretical considerations, it would appear that any vapor permeable polymer can be used as a base having side chain radicals which are weakly bonded to the polymer skeleton and which are also capable of forming a weak bond with the cation or anion of the ionizable compound and any ionizable, vaporizable compound can be used as an activator having a cation or anion capable of being weakly bonded to the side chain radicals. In this way, the particular ion involved is capable of migrating through the semi-conductor body as aforesaid.

It should be understood that the above is only a theoretical explanation and the invention is not intended to be limited by such explanation.

The amount of ionizable compound contained by the polymeric base is not critical so long as there is a substantial amount. The greater the amount of ionizable compound contained in the polymeric base the less the resistance. Consequently, as the amount of ionizable compound is decreased, the resistance increases to a point at which, as in all semi-conductors, it ceases to be practicable for use with presently known circuitry. Also, as the amount of ionizable compound is increased, the resistance decreases to a point at which, as in all semi-conductors, sensitivity is diminished too greatly. By way of example, with moisture as an activator and cellulose as a base, it has been found that resistance ranges achieved by exposing the desiccated cellulose to atmospheres having relative humidities between about 40% and 100% at 80° F. until equilibrium is established are satisfactory.

The pair of electrodes of substantial area is associated with the semi-conductor body in such fashion, preferably on opposite sides of the semi-conductor body, that when the force to be measured is applied to the body, the resultant of such force is in a direction between the two electrodes, i.e. from one electrode to the other.

In the drawings:

FIGURE 1 is a perspective view of a transducer pressure unit of this invention of planar circular shape;

FIGURE 2 is a perspective view of a transducer unit of planar rectangular shape;

FIGURE 3 is a perspective view of a transducer unit of irregular planar shape;

FIGURE 4 is an elevation of a transducer unit of non-planar shape;

FIGURE 5 is a vertical sectional view of a mechanical pressure transducer unit or cassette of this invention;

FIGURE 6 is an exploded perspective view of the pressure sensing unit shown in FIGURE 5;

FIGURE 7 is a vertical sectional view of a modified form of pressure unit;

FIGURE 8 is an exploded perspective view of the pressure unit shown in FIGURE 7;

FIGURE 9 is a vertical sectional view of another modified form of pressure unit;

FIGURE 10 is an exploded perspective view of the pressure unit shown in FIGURE 9;

FIGURE 11 is a vertical sectional view of still another modified form of transducer unit;

FIGURE 12 is an exploded perspective view of the pressure unit shown in FIGURE 11;

FIGURE 13 is a diagrammatic view of a simple form of circuit embodying a transducer unit of this invention with a current measuring device;

FIGURE 14 is a diagrammatic view of a cathode follower circuit embodying a transducer unit of this invention and a current measuring device; and FIGURE 15 is a diagrammatic view of a transistor amplifying circuit embodying a transducer unit of this invention and a current measuring device.

In the drawings illustrating specific embodiments of the invention, FIGS. 1, 2 and 3 show exterior views of cassette transducer units of varying planar shape. Thus, in FIG. 1 is shown cassette 2 of circular planar shape with electrode lead wires 4 extending therefrom. In FIG. 3, cassette 10 is of irregular planar shape and has electrode lead wires 12 extending therefrom. In FIGS. 1, 2 and 3, the cassettes 2, 6 and 10 are shown as completely enclosed and they may be of flexible nature.

In FIG. 4 is shown cassette 14 having electrode lead wires 16 extending therefrom. Cassette 14 is illustrated as of rigid non-planar character and might be formed from molded plastic.

In FIGS. 5 and 6 is illustrated a simple form of pressure-sensing transducer unit of this invention. Thus, the semi-conductive body is illustrated as a single flexible cellophane sheet 18 of circular shape and which may have a thickness of the general order of one-tenth of a millimeter. Such sheet is permeated with moisture by exposing it to an atmosphere of 80% relative humidity at 80° F. prior to encapsulation. Flexible metal foil electrodes 20, such as of aluminum .05 mm. thick, are disposed on opposite sides of the semi-conductor sheet 18 and in electrical contact therewith. Insulated lead wires 22 are secured to said electrodes 20. A covering composed of sheets of soft rubber 24, secured together as by adhesive, completely encloses and hermetically seals the semi-conductor material and electrodes to complete the cassette pressure-sensing unit and protect the contents from moisture while permitting flexibility to be retained.

In FIGS 7 and 8 is illustrated a transducer unit embodying a plurality of sheets of cellulose 28 having the same make-up as the cellulose sheet of FIGS. 5 and 6 and an elastic insulating material such as a rubber washer to provide a restoring force to return the unit readily to its original dimensions after externally applied pressure has been removed. Thus, rubber washer 26 receives snugly the pair of cellophane sheets 28. A pair of flexible metal foil electrodes 30 such as of aluminum are disposed in electrical contact with the outer surfaces of cellophane sheets 28. Insulated lead wires 32 are secured to the respective electrodes. Outer covering members 34 of elastic insulating material, such as of rubber, cooperate with the upper and lower surfaces of washer 26 and are secured thereto as by adhesive so that said outer members 34 and 26 constitute an outer electrically insulating and water-proofing cover for the interior of the transducer unit. When mechanical pressure is removed from the transducer unit, the elasticity of the washer results in the rapid restoring of the electrical characteristics of the unit to those exhibited prior to the application of mechanical pressure.

FIGS. 9 and 10 illustrate a form of transducer unit suitable for measuring pressures in higher ranges. Thus, a flexible elastic lamina 36, suitably of insulating material such as rubber, is provided with apertures 38 which are snugly filled by semi-conductive disks 40. Disks 40 may be of cellophane permeated with water vapor as in FIG. 1. On each side of lamina 36 are semi-conductive cellophane laminae 42 permeated with water vapor as in FIG. 1 which are in electrical contact with each other through disks 40. Adjacent to the outer sides of laminae 42, and in electrical contact therewith are flexible foil electrodes 44, to which are secured insulated lead wires 46. Electrodes 44 conveniently are of aluminum. Electrically insulating cover members 48, suitably of rubber, are secured at their perimeters to lamina 36, for example by adhesive, to enclose the transducer unit. When mechanical pressure is applied to the unit between the electrodes, lamina 36 tends to resist such mechanical pressure in yielding fashion. Consequently, the lowering of the resistance of the semi-conductive cellophane material is retarded, whereby the unit is effective primarily in a higher range of mechanical pressure.

FIGS. 11 and 12 illustrate the use of porous cellophane laminae 50 which are permeated with water vapor as in the FIG. 1 embodiment and to the surfaces of which has been applied a semi-conductor liquid of low volatility such as kerosene (not shown). Electrodes 52, provided with insulated lead wires 54, are disposed outwardly of, and in electrical contact with, laminae 50. Cover members 56, composed of flexible insulating material such as rubber, may be adhesively secured at their perimeters to the margins of laminae 50. The exposed margins of laminae 50 and cover members 56 may be sealed with a high dielectric lacquer (not shown). Such lacquer may be composed of polyvinylidene chloride dissolved in tetrahydrofurane.

In FIG. 13 is shown a simple form of circuitry wherein a source of constant voltage, namely battery 58, is connected to the electrodes of a mechanical pressure transducer 60 of this invention, and a milliammeter 62. When mechanical pressure, such as a weight or other form of mechanical pressure is applied across the electrodes of transducer 60, the resistance of the semi-conductive material therein is reduced, and in accordance with Ohm's law, the amperage is increased as indicated by the milliammeter 62. It will be understood that by calibrating the system with known weights or mechanical pressure, the readings of the milliammeter may be translated directly into measurements of weight, pressure, area or other dimensions.

In certain instances where it is desired to measure widely fluctuating pressures, for example in the determination of vibrations of automobiles in passage over rough roads, a recording milliammeter would desirably be associated with a pressure-sensing transducer of this invention. In order to bring about accurate indication of pressure fluctuation by a pen-type recorder, a cathode-follower type of circuit may be employed to match the electric characteristics of the transducer to the optimum operating characteristic input conditions of the recording current meter. Such a circuit, of more or less conventional character, is illustrated in FIG. 14. Thus, there is illustrated a transducing unit 64 and recording milliammeter 66 with which are associated, in more or less conventional electronic circuits, "1U4" electron tube 68, glow lamp 70, variable resistors 72 and 74, fixed resistors 76 and 78, condenser 80, batteries 82, 84, 86 and 88, and switch 90. Mechanical pressure applied to transducer unit 64 controls the effect of battery 84 on the grid of tube 68. Said grid controls the current flowing in the plate circuit of the tube. This current flows through load resistor 78, control resistor 74 and matching resistor 72. Across matching resistor 72, the recording current meter 66 is attached. Battery 88 supplies voltage of the plate circuit. Battery 86, resistor 76, condenser 80 and glow lamp 70 comprise a circuit element which indicates that switch 90 is closed, and also that battery 88 is of sufficient voltage to operate in the plate circuit.

In cases where it is desired to conserve weight, space and power, a transistor amplifying circuit such as illustrated in FIG. 15 may be employed. In FIG. 15 are shown pressure transducer 92 and milliammeter 94. In the associated circuitry are transistor 95, variable resistors 96 and 98, fixed resistors 100 and 102, batteries 104 and 106, and switch 108. Transistor 95 may be Sylvania NPN type "2N35." Mechanical pressure applied to the electrodes of transducer 92 controls the electricity supplied by battery 104 to transistor 95. The electricity from battery 104 also controls the current from battery 106 flowing through transistor 95 and on through current meter 94, variable resistor 96, variable resistor 98, and resistors 100 and 102. Variable resistor 96 controls the zero setting of meter 94 and variable resistor 98 controls the maximum deflection of the needle of meter 94.

It will be understood that where electricity of constant voltage is passed through the transducing unit that mechanical pressure applied thereto and causing a change of resistance thereof causes the amperage to vary inversely to the change in resistance. On the other hand, if the electricity passing through the transducer is of constant amperage, changes in voltage produced by the mechanical pressure varies directly in relation to the change in resistance.

All the transducers shown in the figures were coupled as shown in FIG. 13 with a battery and milliammeter and pressures were successfully measured by readings of the milliammeter.

A pressure sensing unit exactly like FIG. 5 was made except that a sheet of a vapor permeable polyvinyl chloride was used in place of the cellophane. The resistance of this unit when connected in the circuit of FIG. 13 also varied inversely with the pressure applied and changes in pressure were measured by measuring the current through the unit at constant voltage.

Another pressure sensing unit exactly like FIG. 5 was made except that the cellophane sheet was exposed to an atmosphere of 80% hydrogen chloride (HCl). This unit satisfactorily measured pressure change.

Another unit was made like FIG. 5 except that the cellophane sheet was exposed to an atmosphere of 80% ammonium hydroxide ($NH_4OH$) and it satisfactorily measured pressure change.

It will be noted that the present invention makes possible the measurement of mechanical pressures in a simple, economical and accurate fashion, readily applicable to a wide variety of situations and circumstances.

It will be understood that various changes and modifications may be made in the subject matter herein disclosed while still coming within the scope of the invention.

I claim:

1. A transducer pressure-sensing unit comprising, in combination, a semi-conductor body exhibiting electrical conductance between laterally disposed electrodes in the range of about $$\frac{1}{0.001} \text{ to about } \frac{1}{200}$$

megmhos per square centimeter of electrode surface area, said semi-conductor body containing a vapor permeable polymeric base material, said polymeric base material containing a predetermined quantity of an ionizable, vaporizable compound selected from the group consisting of water, hydrogen chloride, ammonium hydroxide and ammoniacal water, a plurality of electrodes between which said body is located and which are in electrical contact with said semi-conductor body, and a capsular coating enclosing said semi-conductor body and electrodes and constituting an electric and hermetic seal.

2. A transducer pressure-sensing unit comprising, in combination, a semi-conductor body comprising a solid, vapor permeable base material of the group consisting of a cellulosic material and a vapor permeable vinyl resin, said base material containing a predetermined quantity of an ionizable, vaporizable compound selected from the group consisting of water, hydrogen chloride, ammonium hydroxide and ammoniacal water, a pair of electrodes between which said body is located and which are in electrical contact with said semi-conductor body, and a capsular coating enclosing said semi-conductor body and electrodes and constituting an electric and hermetic seal.

3. A transducer pressure-sensing unit comprising, in combination, a semi-conductor body comprising a solid vapor permeable polymeric base material of the group consisting of cellophane, ethyl cellulose, methyl cellulose, unsized rayon fabric and vapor permeable polyvinyl chloride containing a predetermined amount of an ionizable, vaporizable compound of the group consisting of water, hydrogen chloride, ammoniacal water and ammonium hydroxide, a pair of electrodes between which said body is located and which are in electrical contact with said semi-conductor body and a capsular coating enclosing said semi-conductor body and electrodes and constituting an electric and hermetic seal.

4. A transducer pressure-sensing unit comprising, in combination, a semi-conductor body comprising at least one lamina of cellulosic sheet material containing a predetermined quantity of an ionizable, vaporizable compound selected from the group consisting of water, hydrogen chloride, ammonium hydroxide and ammoniacal water, a pair of oppositely disposed electrodes in electrical contact with said body, and a capsular coating enclosing said semi-conductor body and electrodes and constituting an electrical and hermetic seal.

5. A pressure sensing unit comprising a flexible body composed of at least one lamina of cellulosic sheet material, said cellulosic sheet material containing a predetermined amount of vaporizable, ionizable compound selected from the group consisting of water, hydrogen chloride, ammonium hydroxide and ammoniacal water, said flexible body exhibiting semi-conductive electrical properties and varying in resistance inversely with change in pressure thereon, a pair of flexible electrodes disposed on opposed sides of said body and in electrical contact therewith, and an electrically insulating flexible casing enclosing said body and electrodes.

6. A pressure sensing unit comprising a semi-conductor body containing a vapor permeable polymeric base material having a plurality of repeating side chain radicals of the group consisting of hydroxyl radicals and a halogen radical, said polymeric base material containing a vaporizable compound which is ionizable into cations of the group consisting of hydrogen cation and ammonium cation, a plurality of electrodes between which said body is located and which are in electrical contact with said body, and a vapor impervious capsular coating enclosing said body and electrodes and constituting an electric and hermetic seal.

7. A unit according to claim 6, said body being non-particulate.

8. A pressure sensing unit suitable for measuring pressures in higher ranges, said unit comprising an elastic lamina of electrically insulating material, said lamina being apertured to accommodate a plurality of disks, disks of semi-conductive material disposed in said apertures, semi-conductive laminae on the opposed sides of said elastic lamina and contacting the opposed sides of said disks, the semi-conductive material of said disks and laminae having a plurality of repeating side chain radicals of the group consisting of hydroxyl radicals and a halogen radical, said semi-conductive material of said disks and laminae containing a vaporizable compound which is ionizable into cations of the group consisting of hydrogen cation and ammonium cation, a pair of electrodes disposed on the outer opposed sides of said laminae and in electrical contact therewith, and an electrically insulating casing enclosing said laminae and electrodes.

References Cited by the Examiner

UNITED STATES PATENTS

| 2,690,489 | 9/54 | Jarret al. | 338—47 |
| 2,896,095 | 7/59 | Reed et al. | 307—149 |
| 2,939,317 | 6/60 | Mason | 73—88.5 X |
| 3,024,641 | 3/62 | Fix | 73—35 |

OTHER REFERENCES

"Pressure Sensitive Material Measures Explosion Forces or Footfall of a Fly," reprinted from Product Eng., September 16, 1957, McGraw-Hill Publishing Co., Inc.

RICHARD C. QUEISSER, Primary Examiner.

ROBERT EVANS, Examiner.